US006810402B2

(12) United States Patent
Bates et al.

(10) Patent No.: US 6,810,402 B2
(45) Date of Patent: Oct. 26, 2004

(54) METHOD AND COMPUTER PROGRAM PRODUCT FOR COLOR CODING SEARCH RESULTS

(75) Inventors: Cary Lee Bates, Rochester, MN (US); John Matthew Santosuosso, Rochester, MN (US); Waheed Sujjad, Nashville, TN (US)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 09/855,934

(22) Filed: May 15, 2001

(65) Prior Publication Data

US 2002/0174118 A1 Nov. 21, 2002

(51) Int. Cl.[7] .............................. G06F 17/00; G06F 7/00
(52) U.S. Cl. ........................................ 707/104.1; 707/3
(58) Field of Search .............................. 707/3, 5, 100, 707/104.1; 715/528; 345/700

(56) References Cited

U.S. PATENT DOCUMENTS

| | | | |
|---|---|---|---|
| 6,026,409 A | * | 2/2000 | Blumenthal ............... 707/104.1 |
| 6,052,108 A | | 4/2000 | Gadd ......................... 345/141 |
| 6,070,176 A | | 5/2000 | Downs et al. ............... 707/513 |
| 6,094,648 A | * | 7/2000 | Aalbersberg ................... 707/3 |
| 6,636,853 B1 | * | 10/2003 | Stephens, Jr. ................. 707/10 |

OTHER PUBLICATIONS

Schneider, Eric, "Method, Product, and Apparatus for Providing Search Results", Jun. 12, 2003, Pub No.: U.S. 2003/0110161 A1, p. 2.*

Keith, Robert Olan JR., "Method and Apparatus for Performing a Research Task by Interchangeably Utilizing a Multitude of Search Methodologies", Pub.No.: U.S. 2002/0091686 A1, Jun. 11, 2002, p. 2.*

Li, Wen–Syan, "Focused Search Engine and Method", Pub.No.: U.S. 2002/0099700 A1, paragrapg 7.*

Zhuang Y. et al.: "Applying Semantic Association to Support Content–Based Video Retrieval" International Workshop on Very Low Bitrate Video Coding, Proceedings of VLBV98, Urbana, IL, Oct. 8–9, 1998 pp. 45–48.

Research Disclosure, " Web Page Findability Assessment Tool" No. 415122, Oct. 1998.

* cited by examiner

Primary Examiner—Greta Robinson
Assistant Examiner—Susan Rayyan
(74) Attorney, Agent, or Firm—McGuireWoods LLP; John R. Pivnichny

(57) ABSTRACT

Colors are associated with source locators such as URLs that identify sources found by a search, in order to enable a searcher to see at a glance how closely the search results match keywords that convey the searcher's intended search criteria. A browser prompts keyword entry, reads the keywords, associates colors with the keywords to form a color code, and displays a color code map that explains the color code to the searcher. The browser sends the keywords to a search engine. The search engine performs a search, and sends to the browser source locators that identify sources of interest such as web pages, along with occurrence data indicative of how often each of the keywords appears in each of the sources. For each source locator, the browser formulates a correlation indicator, which includes a visual area that is colored according to the color code and the occurrence data for occurrence of each keyword. The browser displays links to the sources and the associated correlation indicators to the searcher.

20 Claims, 6 Drawing Sheets

METHOD AND COMPUTER PROGRAM PRODUCT FOR COLOR CODING SEARCH RESULTS

FIELD OF THE INVENTION

The present invention applies generally to computer-assisted searching, and more particularly to a method and computer program product for color coding search results as a convenience for interpreting search output that includes a large number of sources.

BACKGROUND

Internet users conduct searches to find pages on the World Wide Web that provide information about topics of interest. The topic of the search is specified by a set of keywords that the searcher enters on the input line of a web browser in response to prompts by the browser.

Some browsers permit searchers to enter not only keywords, but also requirements stated in Boolean logic that must be satisfied before a web page containing one or more of the keywords is judged to be relevant to the search. Nevertheless, having the option of using Boolean logic to specify conditions of the search is not always helpful, as many searchers find that working with Boolean logic is beyond their capabilities. Furthermore, details of the syntax for specifying Boolean logic often vary from browser to browser, and even a searcher who understands how to specify Boolean search criteria in principle maybe unable to do so in practice for a particular web browser at hand.

As a result, many searchers simply enter a few keywords on the browser's input line and proceed with the search. Browsers often interpret such entries as requests to find web pages that contain any one or more of the keywords—i.e., the default relationship among the keywords is logical union or "inclusive-or"—and therefore cast a wide net. Often, the search returns an unusably large number of sources, as a consequence of the very large number of web pages now accessible through the Internet.

To help manage the flood of information generated by an "inclusive-or" search, the search engine normally ranks the sources it finds according to its own rules, and presents the sources to the searcher as a list of web page links arranged from first to last according to the ranking. Unfortunately, the searcher is often unaware of the search engine's rules. So, lacking any better way to proceed, the searcher must often access and view numerous web pages before finding any truly relevant information.

For example, a searcher might enter three keywords, the words "alpha," "beta," and "gamma."The search engine would then find sources that include the keyword "alpha" in isolation, sources that include the keyword "beta" in isolation, sources that include the keyword "gamma" in isolation, sources that include both the keywords "alpha" and "beta," sources that include all three keywords, and so forth. It may be the searcher's intention, however, that at least two of the three keywords—or even that all three keywords—should appear before a source is judged to be relevant to the search.

Nevertheless, the search engine may first present links to sources that contain only the keyword "beta," and only far down the list present links to sources that contain all three of the keywords. In other cases, the search engine might find only a single source that contains all three keywords, and put a link to this source at the top of the list. In the list, however, the first link might be followed by a large number of links to sources that are irrelevant according to the searcher's intentions, thereby requiring the searcher—who is unaware that these links are to web pages that contain only one or two of the keywords—to spend considerable time accessing and viewing irrelevant web pages.

More generally, with today's technology the searcher does not always have a clear picture of which keywords occur in which of the sources found in a basic "inclusive-or" search. So, from the searcher's point of view, the purpose of the search—to narrow the list of sources that must be examined in order to find relevant information—is effectively thwarted. As a result, the time spent on the search and the complexity of the search grow unproductively, because the searcher must often go back to the search engine with a new set of keywords or with an attempt to formulate stricter search criteria using Boolean logic.

Thus there is a need for a way of presenting the results of a search so that the searcher may form an effective picture of the relevance of the sources found by the search engine, in order that the searcher need not examine sources that lack relevant information yet appear nevertheless in the list of sources found by the search engine.

SUMMARY

The present invention enables a searcher to see at a glance how closely the sources found by a search engine match the keywords that convey the searcher's intended search criteria. In the case of an Internet search, the searcher's browser prompts the searcher to enter the keywords, for example on an input line presented on a display screen of a computer. The browser reads the keywords, associates colors with the keywords to provide a color code, and displays a color code map that explains the color code to the searcher in an intuitive way. The browser then sends the keywords over the Internet to a search engine.

The search engine executes a search, and sends to the browser a set of uniform resource locators (URLs) that identify web pages purportedly relevant to the search, along with occurrence data that report, for example, whether each keyword is present or absent in each web page, or how often each of the keywords occurs in each of the web pages, either in absolute terms or in terms relative to the occurrences of other keywords.

For each URL, the browser formulates a correlation indicator. The correlation indicator includes a visual area that is colored according to the color code and the occurrence data. The browser displays links to the URLs and the associated correlation indicators to the searcher.

For example, the searcher might enter the keywords "cricket," "bat" and "Canada" on the input line. The browser might then associate the color blue with the word "cricket," the color green with the word "bat," and the color red with the word "Canada." The browser might then display the color code map in the form of a horizontal bar that appears just below the input line, wherein the bar is colored so that the segment of the bar that appears beneath the word "cricket" is blue, the segment of the bar beneath the word "bat" is green, and the segment of the bar beneath the word "Canada" is red.

In this example, the correlation indicators might also be horizontal bars. For a URL that identified a web page that included the keyword "cricket" but neither "bat" nor "Canada," perhaps a web page on insects, the entire correlation indicator bar could be colored blue. The all-blue bar would alert the searcher that the keyword "cricket" was found but not the other keywords. For a web page that included the words "cricket" and "bat" but not the keyword "Canada," perhaps a web page on sports in England, the correlation indicator bar could be colored in part blue and in part green, but without the appearance of the color red. The part-blue-part-green-absent-red bar would alert the searcher that the keywords "cricket" and "bat" were found, but not the keyword "Canada." For a web page that included all three keywords, perhaps a web page on sports in Canada, the correlation indicator bar could be colored in part blue, in part green, and in part red. For a web page that included the keyword "Canada" but neither "cricket" nor "bat," the bar might be colored entirely red, and so forth.

In other embodiments of the invention, the correlation indicator may show the frequency of occurrence or the relative frequency of occurrence of each keyword in the web page identified by the URL, rather than show just the presence or absence of the keyword as described above. For example, if a web page contained the keyword "cricket" eight times and the keyword "bat" two times, eighty percent of the visual area of the correlation indicator could be blue and twenty percent green. In another embodiment, a visual area may be reserved in the correlation indicator for each of the keywords, where each of these areas is colored according to the color code in proportion to the relative frequency of occurrence of the associated keyword (or left uncolored for keywords absent from the source). In the running example here, eighty percent of the visual area in the correlation indicator associated with the keyword "cricket" might be colored blue (and the remaining twenty percent left uncolored or colored according to a background color not associate with any of the keywords), and twenty percent of the visual area in the correlation indicator colored green (and the remaining eighty percent left uncolored or colored according to the background). Thus the searcher may readily grasp the relevance of each source to the search by glancing at the colors of the correlation indicators, and no longer needs to rely on the positions of the sources in the list returned by the search engine.

Although the present invention is described here in the general context of an Internet search as a matter of convenience, the Internet is not a necessary condition of the invention. Rather, the invention applies to all kinds of search environments, including, for example, searches conducted locally by a workstation or terminal that has a built-in CD ROM database, and searches wherein the search engine is local to the searcher but the database is remote. These and other aspects of the present invention will be more fully appreciated when considered in the light of the following detailed description and drawings.

DETAILED DESCRIPTION

The present invention associates colors with search keywords and associates a color-coded correlation indicator with each source found by the search. By glancing at the coloration of a source's correlation indicator, a searcher may readily comprehend how closely the source matches the keywords.

Figure 1:
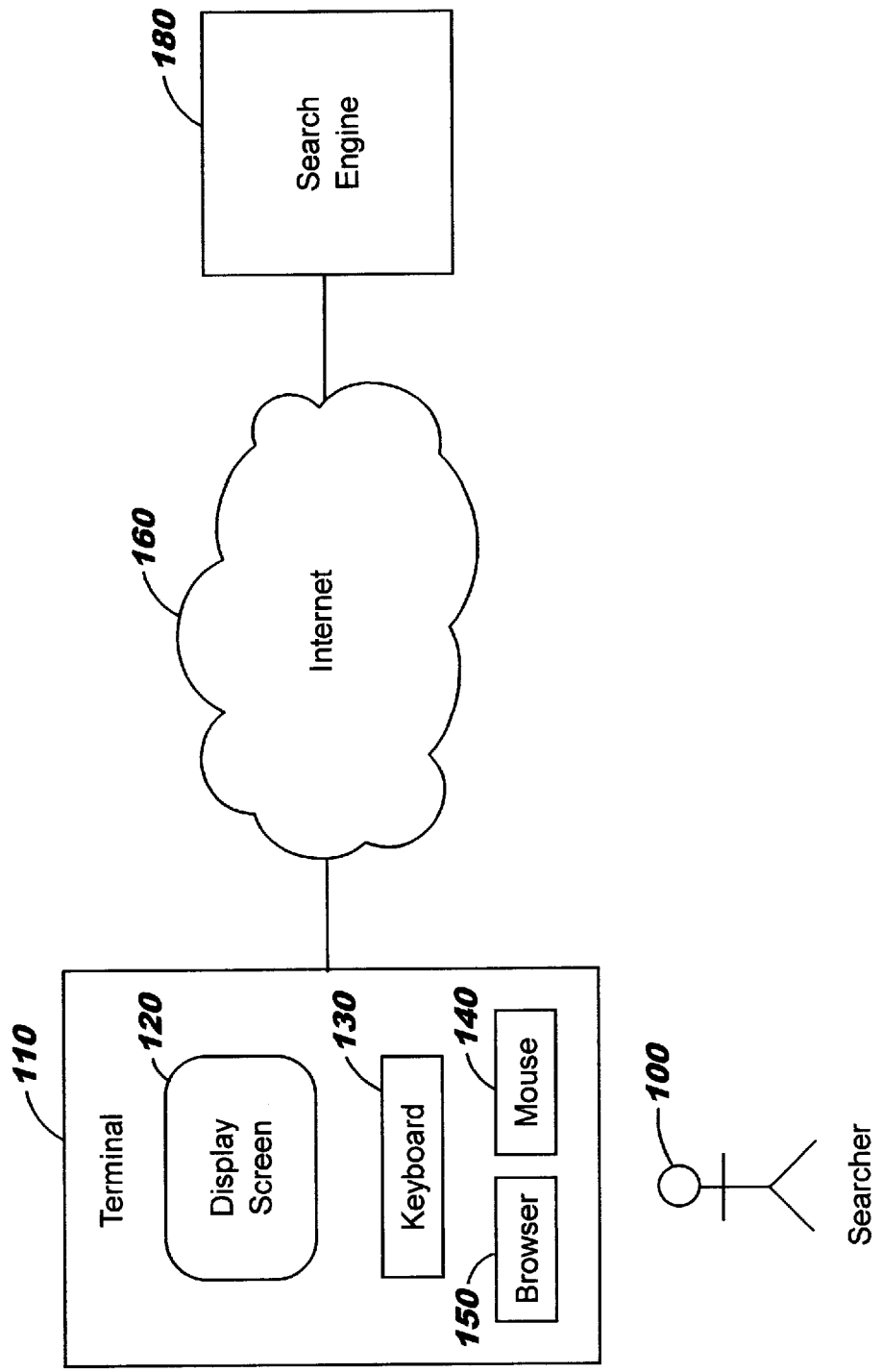
FIG. 1 shows a search environment that is suitable for the present invention.

FIG. 1 shows an exemplary search environment suitable for the present invention. In FIG. 1, a searcher 100 employs a terminal 110 such as a computer terminal, a personal digital assistant, a web-enabled cellular telephone, and so forth. The terminal 110 may include a computer mouse 140, a visual display screen 120, and a keyboard 130 which may be a computer keyboard, a keypad, or other input device such as speech-recognition apparatus, screen-pointer-location or stylus-selection apparatus, and so forth, by which the searcher 100 enters information. The terminal 110 may also include a browser 150 for accessing and viewing pages of the World Wide Web (web pages).

In FIG. 1, the terminal 110 is operably connected to a search engine 180 through the Internet 160. To conduct a search, the searcher 100 may enter keywords into the browser 150 using the keyboard 130 or other input device and the display screen 120. The browser 150 sends the keywords over the Internet 160 to the search engine 180. The search engine 180 conducts an Internet search to locate web pages that contain the keywords, according to methods that are well known to those skilled in the art, and returns to the browser 150 the results of the search. The search results may include a list of uniform resource locators (URLs) that identify sources such as web pages that contain one or more of the keywords, along with occurrence data that report, for example, whether each keyword is present or absent in each source, or how often each of the keywords occurs in each of the sources, either in absolute terms or in terms relative to the occurrences of the other keywords. The browser 150 presents the results of the search to the searcher 100 on the display screen 120.

FIG. 1 shows the display screen 120, keyboard 130, mouse 140, and browser 150 as separate elements internal to the terminal 110, and the search engine 180 as a separate element external to the terminal 110, only for the purposes of expository clarity, and not for the purpose of limitation—these elements may be combined in various combinations and may be either external or internal to the terminal 110. Moreover, although the present invention is described here in the general context of an Internet search environment as a matter of convenience, neither the Internet nor any other communication network is a necessary condition of the invention. Rather, the invention applies to all kinds of search environments, including, for example, searches conducted locally by a workstation or terminal 110 that has a built-in CD ROM database, and searches wherein the search engine 180 is local to the searcher or built into the terminal 110 but the data to be searched is remote.

Figure 2A:
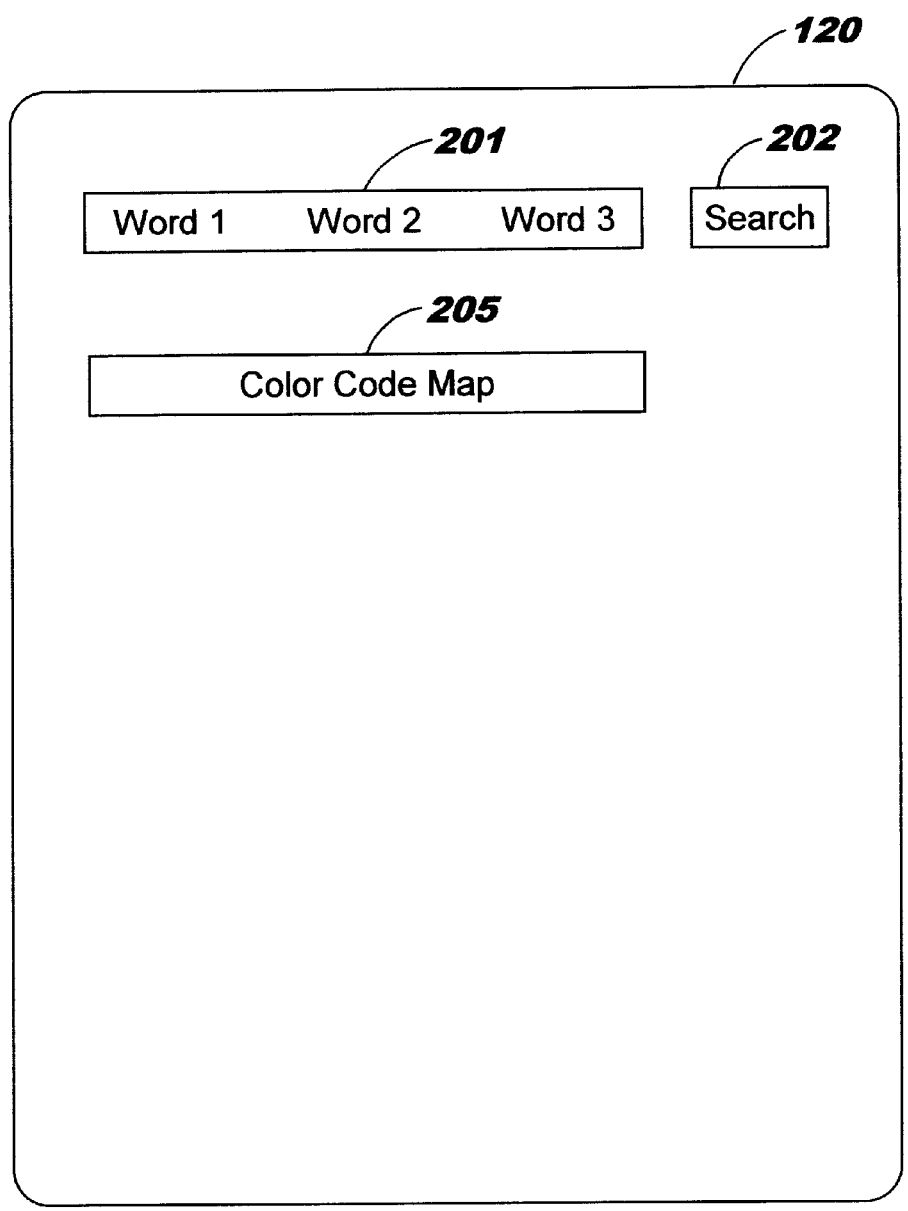
FIGS. 2A and 2B show exemplary display screen images according to aspects of the present invention.

FIG. 2A shows an example of an image that may appear on the display screen 120. The exemplary image includes an input line 201, wherein keywords may appear as they are entered into the browser 150 by the searcher 100 with the help of the keyboard 130 or other input device. On the input line 201, FIG. 2A shows three keywords, word1, word2, and word3. Also shown in FIG. 2A are a search button 202, which the searcher 100 engages in order to send the keywords to the search engine 180, and a color code map 205, which is described in more detail below. The purpose of the color code map 205 is to provide the searcher 100 with a visual association between colors and keywords.

Figure 2B:
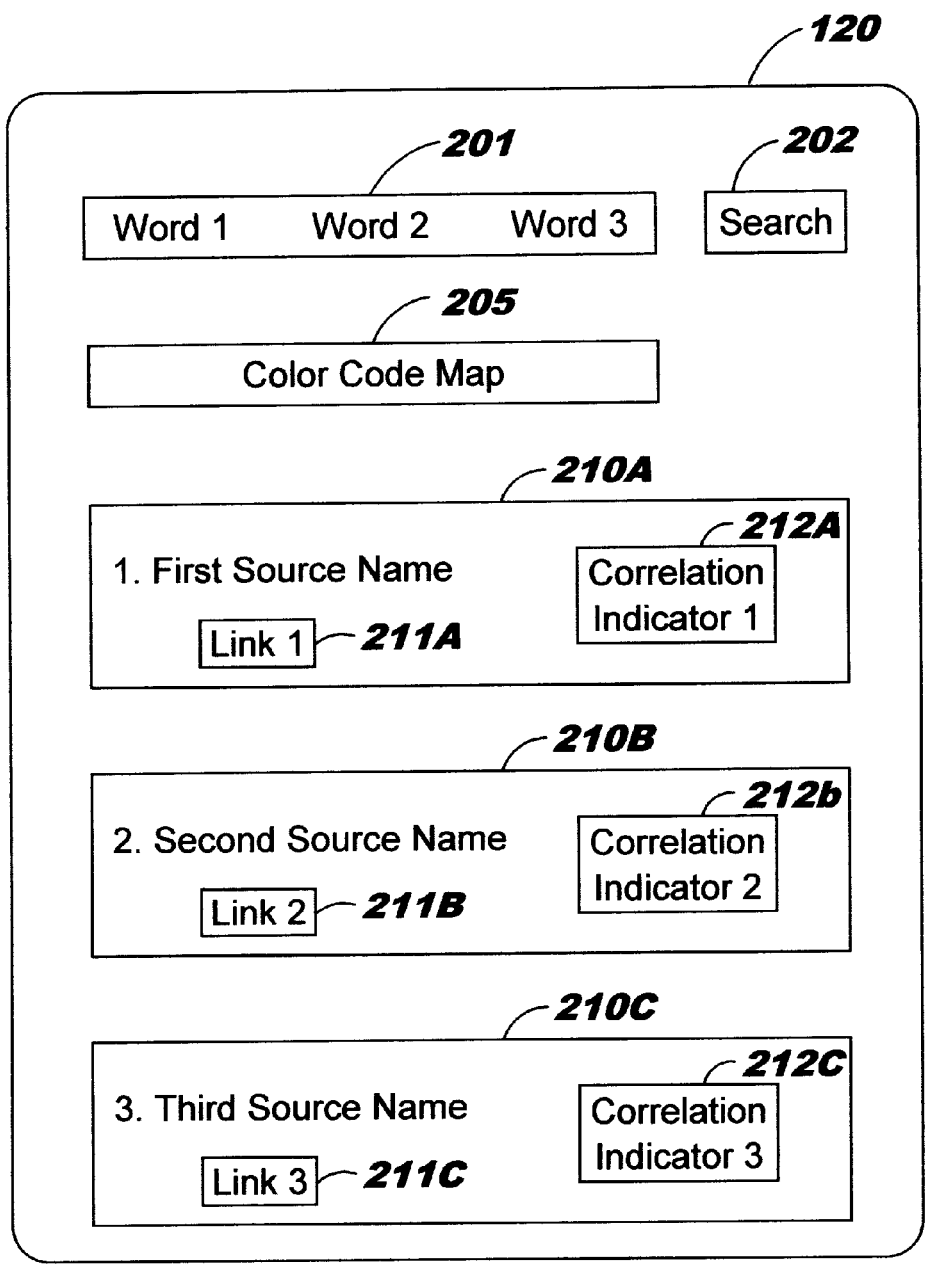

FIG. 2B shows another example of an image that may appear on the display screen 120. In addition to the input line 201, search button 202, and color code map 205 that are shown in FIG. 2A, FIG. 2B shows a exemplary presentation of search results. The exemplary presentation includes information about a first web page 210A, information about a second web page 210B, and information about a third web page 210C found by the search.

The information about the first web page 210A includes a link to a first URL 211A that identifies the first web page, and a first correlation indicator 212A; the information about the second web page 210B includes a link to a second URL 211B that identifies the second web page, and a second correlation indicator 212B; and the information about the third web page 210C includes a line to a third URL 211C that identifies the third web page, and a third correlation indicator 212C. The first correlation indicator 212A includes a visual area that is colored according to the color code and the occurrence data of each keyword that occurs in the web page identified by the first URL 211A. Likewise for the second and third correlation indicators 212B and 212C, with respect to the second and third URLs 211B and 211C. The correlation indicators 212A–212C are described further below. Although FIG. 2B shows an exemplary presentation of information about three web pages found by a search, the number three is used here only for purposes of illustration, and the invention applies as well to more than three web pages and less than three web pages.

Figure 3:
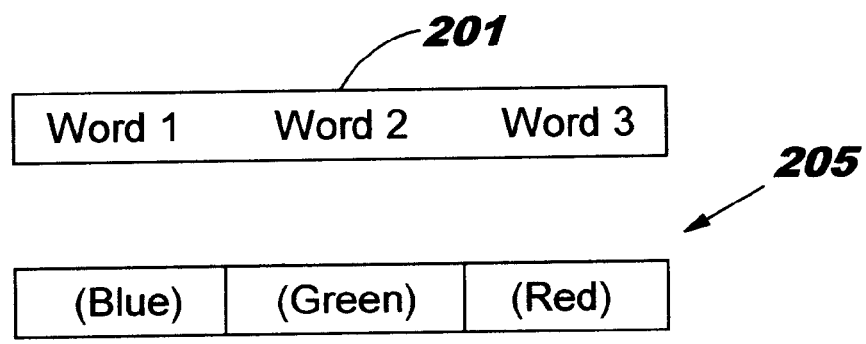
FIG. 3 shows an exemplary color code map suitable for inclusion in the exemplary display images of FIGS. 2A and 2B.

FIG. 3 shows an exemplary configuration of the color code map 205 with reference to the input line 201 and the keywords displayed on the input line 201. In FIG. 3, the exemplary color code map 205 is a horizontal bar that is displayed just below the input line 201. The purpose of the color code map 205 is to visually associate colors with the keywords that appear on the input line 201. For example, keywords word1, word2, and word3 might appear on the input line 201 as shown in FIG. 3, and be associated with the colors blue, green, and red, respectively. To convey this association, the exemplary horizontal-bar color code map 205 might have three segments: a blue segment 206 that appears beneath word1, a green segment 207 that appears beneath word2, and a red segment 208 that appears below word3.

In order to provide assistance to searchers with advanced skills, a Boolean expression in part or in its entirety may be treated as a keyword. Under this broader definition, a search keyword might be, for example, "alpha and not beta" or "gamma and delta or epsilon." In such situations, the Boolean expression would be treated as though it were a single term keyword with respect to the color code map 205 and the color coded correlation indicator 212 (further described below). For example, the keyword "alpha andnot beta" might be associated with the color green in both the color code map 205 and the color coded correlation indicator 212, in which case, continuing the example above, the green segment 207 of the color code map 205 would appear beneath the keyword "alpha andnot beta."

It is not necessary, however, that the color code map 205 be a horizontal bar as shown in FIG. 3. Rather, the color code map 205 may have any form that associates colors with keywords. Pie charts, rectangular lists, and other geometric shapes and artifacts may be used as well. Further, the color code map 205 may be implicit rather than explicit. When the color code map 205 is implicit, the keywords themselves appear on the input line 201 in colors according to the color code. In the foregoing example, word1 might appear in blue characters in the input line 201, word2 might appear in green characters, and word3 in red.

For each URL that the search engine 180 returns to the browser 150, a correlation indicator 212 is formulated. The correlation indicator 212 includes a visual area that is colored according to the color code of the color code map 205 and according to the occurrence data for each keyword that occurs in the web page identified by the URL. The browser 150 displays the URLs and the associated correlation indicators 212 to the searcher 100 as shown, for example, in FIG. 2B.

Figure 4A:
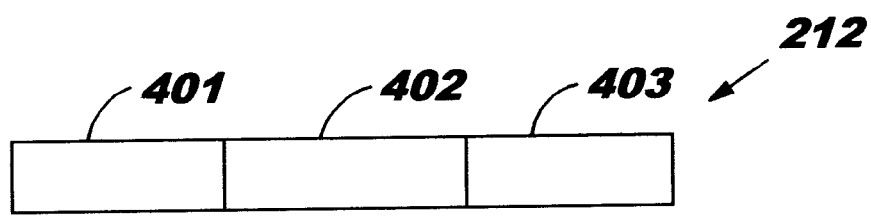
FIGS. 4A and 4B show exemplary configurations of correlation indicators suitable for inclusion in the exemplary display image of FIG. 2B.

The correlation indicator 212 may have the form of a horizontal bar as shown in FIG. 2B, divided into a number of segments according to the number of keywords on the display line 201. For example, if there are three keywords, the horizontal bar correlation indicator may have three segments 401, 402, and 403 as shown in FIG. 4A, associated respectively with the keywords and their colors. When a URL returned by the search engine 180 contains keyword word1, for example, the first segment 401 of the horizontal bar correlation indicator may be colored blue. If the web page that is identified by the URL returned by the search engine does not contain keyword word1, then the first segment 401 of the horizontal bar may be left uncolored, or colored according to a background color not associated with any keyword by the color code map 205. When the web page contains keyword word2, the second segment 402 of the bar may be colored green, or left uncolored if the web page does not contain keyword word2, and likewise in kind for keyword word3. Thus, by glancing at the colors of the correlation indicator 212, the searcher 100 may readily grasp the relevance of the URL to the search.

Figure 4B:
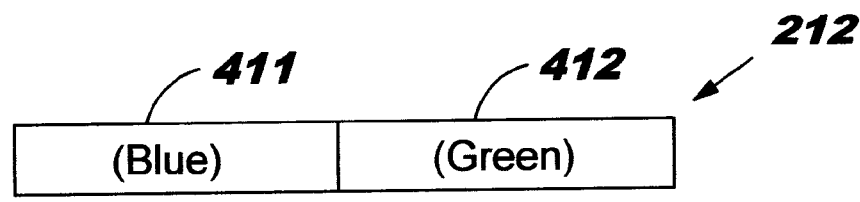

When a particular keyword does not appear in the web page identified by the URL, it is not necessary that the correlation indicator 212 have an uncolored segment in recognition of the absence of that keyword. In the running example here, when the web page contains word1 and word3, but not word2, the correlation indicator 212 may be a horizontal bar that has only two segments as shown in FIG. 4B, a blue segment 411 and a green segment 412, which together constitute the entirety of the bar. In the same way, when only one of the keywords appears in the web page, the entire correlation indicator 212 may be a single color.

In other embodiments of the invention, the correlation indicator 212 may indicate the relative frequency of occurrence of each keyword in the web page identified by the URL rather than just the presence or absence of the keyword as described above. For example, if a web page contained the keyword word1 eight times and the keyword word2 two times, eighty percent of the visual area of the correlation indicator 212 may be blue and twenty percent green. In another embodiment, a visual area may be reserved in the correlation indicator 212 for each of the colors of the color code map 205, and each of these visual areas colored (or left uncolored) in proportion to the frequency of occurrence of the associated keyword. In the running example here, eighty percent of the visual area in the correlation indicator 212 associated with the keyword word1 might be colored blue (and the remaining twenty percent left uncolored or colored according to a background color not associate with any of the keywords), twenty percent of the visual area in the correlation indicator 212 associated with the keyword word2 might be colored green (and the remaining eighty percent left uncolored or colored according to the background), and all of the visual area in the correlation indicator 212 associated with the keyword word3 might be left uncolored, in recognition of the absence of word3 from the web page. In yet another embodiment, the portion of the correlation indicator 212 associated with a particular keyword may be colored with a depth of color that indicates the frequency of occurrence or the relative frequency of occurrence of the keyword. For example, when the relative frequency of occurrence is high for the keyword associated with the color green by the color code map 205, the associated visual area of the correlation indicator 212 might be colored with a deep green; conversely, when the relative frequency of occurrence is low, the visual area might be colored with a light green.

Although the correlation indicator 212 has been explained here for descriptive convenience as a horizontal bar, it is not necessary that the correlation indicator 212 have this form. The correlation indicator 212 may be any visual presentation that uses a color code to convey the presence or absence, or the frequency of occurrence, or the relative frequency of occurrence, of keywords in a web page.

Figure 5:
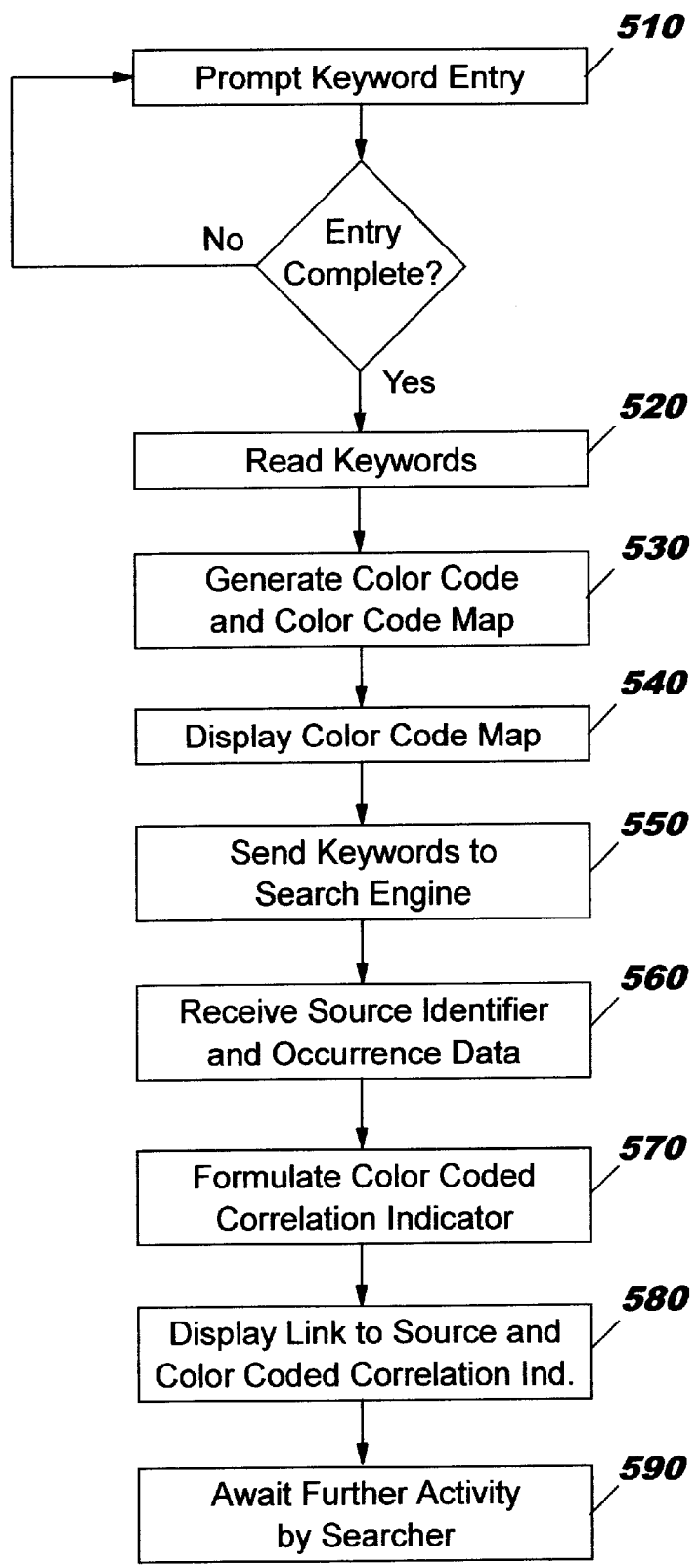
FIG. 5 is a flowchart that shows aspects of the operation of the present invention.

FIG. 5 shows aspects of the operation of the invention. Although the operation of the invention with reference to FIG. 5 is described below in terms of a web browser, the invention applies as well to other computer programs, software, logic, and configurations that provide the functions described.

In FIG. 5, the browser 150 prompts the searcher 100 to enter keywords to define a search (step 510). As the searcher 100 enters the keywords, the keywords may appear on the input line 201 of the display 120. The searcher 100 may indicate completion of the entry of keywords by engaging the search button 202 using the computer mouse 140. Until the searcher 100 indicates completion, the browser awaits the further entry of keywords (step 510). When the searcher 100 indicates completion of the entry of keywords, the browser 150 reads the keywords (step 520). The browser 150 or other logic generates the color code map 205, which associates colors with the keywords as described above (step 530). The color code map 205 is displayed on the display 120, preferably in a location near the input line 201 (step 540), so that the searcher 100 may conveniently look at both the input line 201 and the color code map 205 substantially at the same time. For example, the color code map 205 may be a horizontal bar displayed just below the input line 201.

Further in response to the engagement of the search button 202 by the searcher 100, the browser 150 sends the keywords over the Internet 160 to the search engine 180 (step 550). Using conventional methods, the search engine 180 executes the search, and returns to the browser 150 a list of source locators such as URLs that identify sources found by the search, and, for each of these sources, occurrence data for the keywords. The browser 150 receives the list and the occurrence data from the search engine 180 (step 560), and formulates a correlation indicator 212 as described above for each source locator (step 570). The browser 150 then displays on the display 120 links to the sources and, conveniently near each link, the associated correlation indicator (step 580). The browser 150 then awaits further activity by the searcher 100 (step 590).

From the foregoing description, those skilled in the art will recognize that searcher may now readily grasp the relevance of each source such as a web page from visual presentation of colors by the correlation indicators, and no longer need waste time and communication bandwidth accessing and viewing sources that lack relevant information but appear nevertheless in the list provided by the search engine. The foregoing description is illustrative rather than limiting, however, and the scope of the present invention is limited only by the following claims.

We claim:

1. Programmable media containing programmable software that color codes the results of a search, the programmable software comprising the steps of:

associating colors with search keywords to generate a color code;

displaying on a display screen a color code map describing the color code;

for a source found during a search, formulating a color coded correlation indicator responsive to occurrence data associated with the keywords and associated color code; and displaying the color coded correlation indicator on the display screen with, at least, the color code map and associated keywords.

2. Programmable media containing programmable software that color codes the results of a search, the programmable software comprising the steps of:

associating colors with search keywords to generate a color code;

displaying on a display screen a color code map describing the color code;

executing a search to provide search results;

for a source found during the search, formulating a color coded correlation indicator responsive to occurrence data associated with the keywords; and displaying the search results and the color coded correlation indicator on the search result display screen with the color code map and associated keywords.

3. Programmable media containing programmable software that color codes the results of a search, the programmable software comprising the steps of:

prompting a searcher to enter search keywords on an input line of a display screen;

reading the keywords;

associating colors with the keywords to generate a color code;

displaying on the display screen a color code map describing the color code;

sending the keywords to a search engine for executing a search;

receiving from the search engine a resource locator that identifies a source found by the search and occurrence data associated with the source and the keywords;

responsive to the occurrence data, formulating a color coded correlation indicator; and displaying on the display screen the color coded correlation indicator with a color code map and associated keywords and a link to the source identified by the resource locator.

4. Programmable media containing programmable software that color codes the results of an Internet search, the programmable software comprising the steps of:

prompting a searcher to enter search keywords on an input line of a display screen;

reading the keywords;

associating colors with the keywords to generate a color code;

displaying on the display screen a color code map describing the color code;

sending the keywords to an Internet search engine for executing a search;

receiving from the search engine a uniform resource locator that identifies a web page found by the search and occurrence data associated with the web page and the keywords;

responsive to the occurrence data, formulating a color coded correlation indicator and associated color code; and displaying on the display screen the color coded correlation indicator with the color code map and associated keywords and a link to the web page.

5. The programmable media containing programmable software of claim 4, wherein the color code map is a substantially horizontal bar displayed below the input line on the display.

6. The programmable media containing programmable software of claim 4, wherein the occurrence data indicates presence or absence the keywords in the web page.

7. The programmable media containing programmable software of claim 4, wherein the occurrence data indicates relative frequency of occurrence of the keywords in the web page.

8. The programmable media containing programmable software of claim 4, wherein at least one keyword is a Boolean expression.

9. The programmable media containing programmable software of claim 4, wherein at least one color shade of at least one visual area of the color coded correlation indicator indicates relative frequency of occurrence of a keyword.

10. A method of color coding the results of a search, comprising the steps of:
    associating colors with search keywords to generate a color code;
    displaying on a display screen a color code map describing the color code;
    for a source found during a search, formulating a color coded correlation indicator responsive to occurrence data associated with the keywords and associated color code; and
    displaying the color coded correlation indicator on the display screen with the color code map and associated keywords.

11. A method of color coding the results of a search, comprising the steps of:
    associating colors with search keywords to generate a color code;
    displaying on a display screen a color code map describing the color code;
    executing a search to provide search results;
    for a source found during the search, formulating a color coded correlation indicator responsive to occurrence data associated with the keywords and associated color code; and
    displaying the search results and the color coded correlation indicator on the display screen with the color code map and associated keywords.

12. A method of color coding the results of a search, comprising the steps of:
    prompting a searcher to enter search keywords on an input line of a display screen;
    reading the keywords;
    associating colors with the keywords to generate a color code;
    displaying on the display screen a color code map describing the color code;
    sending the keywords to a search engine for executing a search;
    receiving from the search engine a resource locator that identifies a source found by the search and occurrence data associated with the source and the keywords;
    responsive to the occurrence data, formulating a color coded correlation indicator; and
    displaying on the display screen the color coded correlation indicator with the color code map and associated keywords and a link to the source identified by the resource locator.

13. A method for color coding the results of an Internet search, comprising the steps of:
    prompting a searcher to enter search keywords on an input line of a display screen;
    reading the keywords;
    associating colors with the keywords to generate a color code;
    displaying on the display screen a color code map describing the color code;
    sending the keywords to an Internet search engine for executing a search;
    receiving from the search engine a uniform resource locator that identifies a web page found by the search and occurrence data associated with the web page and the keywords;
    responsive to the occurrence data, formulating a color coded correlation indicator; and
    displaying on the display screen the color coded correlation indicator with the color code map and associated keywords and a link to the web page.

14. The method of claim 13, wherein the color code map is a substantially horizontal bar displayed below the input line on the display.

15. The method of claim 13, wherein the occurrence data indicates presence or absence the keywords in the web page.

16. The method of claim 13, wherein the occurrence data indicates relative frequency of occurrence of the keywords in the web page.

17. The method of claim 13, wherein at least one keyword is a Boolean expression.

18. The method of claim 13, wherein at least one color shade of at least one visual area of the color coded correlation indicator indicates relative frequency of occurrence of a keyword.

19. The programmable media containing programmable software of claim 4, wherein the color code map comprises keywords appearing in colors according to the color code.

20. The method of claim 13, wherein the color code map comprises keywords appearing in colors according to the color code.

* * * * *